United States Patent [19]

McGregor et al.

[11] 4,389,510
[45] Jun. 21, 1983

[54] WATER SOLUBLE POLYIMIDE PREPARED FROM 1,2,3,4 BUTANE TETRACARBOXYLIC ACID AND METHOD OF PREPARATION

[75] Inventors: Charles W. McGregor; Lionel J. Payette, both of Fort Wayne, Ind.

[73] Assignee: United Technologies Corporation, Hartford, Conn.

[21] Appl. No.: 255,206

[22] Filed: Apr. 17, 1981

[51] Int. Cl.³ .............................................. C08G 73/10
[52] U.S. Cl. ................................ 524/600; 174/110 R;
528/182; 528/188; 528/210; 528/220; 528/224;
528/229; 528/351; 528/352; 528/353
[58] Field of Search ................. 528/353, 352; 524/600

[56] References Cited

U.S. PATENT DOCUMENTS

| | | | |
|---|---|---|---|
| 3,673,145 | 6/1972 | Minami et al. | 528/353 |
| 3,840,495 | 10/1974 | Balme et al. | 528/353 |
| 3,925,313 | 12/1975 | Kojima et al. | 528/353 |

FOREIGN PATENT DOCUMENTS

| | | | |
|---|---|---|---|
| 2434176 | 5/1975 | Fed. Rep. of Germany | 528/353 |
| 2519673 | 11/1975 | Fed. Rep. of Germany | 528/353 |
| 44-67809 | 1/1969 | Japan | 528/353 |
| 50-2077141 | 12/1975 | Japan | 528/353 |

Primary Examiner—Lester L. Lee
Attorney, Agent, or Firm—Harry J. Gwinnell

[57] ABSTRACT

A water soluble polyimide is described comprising the reaction product of butane tetracarboxylic acid (BTC), a multifunctional amine of the formula:

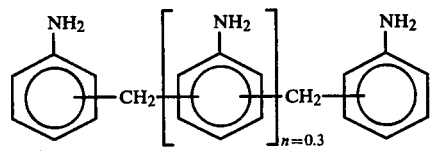

and a diamine, where the multifunctional amine constitutes at least 5% of the total amine equivalents of the reactants and preferably 15% to 40%. An aqueous solution of this polyimide, a method of coating electrical conductors with this polyimide, and the electrical conductors insulated with the polyimide are also described. The polyimide, particularly useful as an insulation coating for magnet wire, is made by reacting the multifunctional amine with the BTC followed by reaction with the diamine, removing the condensed water produced during the reaction.

7 Claims, No Drawings

WATER SOLUBLE POLYIMIDE PREPARED FROM 1,2,3,4 BUTANE TETRACARBOXYLIC ACID AND METHOD OF PREPARATION

DESCRIPTION

1. Technical Field

The field of art to which this invention pertains is water containing solvent systems of nitrogen containing carbon compounds, methods of coating and articles coated therewith. Specifically, the invention is directed to water soluble polyimides and electrical conductors coated therewith.

2. Background Art

With increased awareness of environmental pollution and energy resource depletion, attempts have been made to eliminate the need for organic solvent systems for polymer solutions. One approach to this problem has been the use of polymer systems which can be used in the hot melt state. Note, for example, U.S. Pat. No. 4,075,179. Another approach to this problem has been the replacement of organic solvents with water solutions. However, countless problems have been encountered in attempting to work up aqueous solutions of useful industrial polymers. For example, one problem has been the limited solubility of such polymers in water. Accordingly, it has been necessary to either start with low molecular weight polymers, mix water with organic solvent systems, build high acid numbers into the polymers, use strong bases in conjunction with the water to dissolve the polymers, or use dilute solutions of the low solubility polymers. Another problem has been the inferior mechanical properties such as flexural strength of the polymers once they have been put to their ultimate use, vis-a-vis similar polymers in organic solvents. For example, in the magnet wire area, there has been a problem with water craze resistance properties of water soluble polymers once they have been put on the wire and the water driven off, and the polymer crosslinked. This is a good indication of the moisture resistance of the polymer, a problem in this area. Crazing is a phenomenon seen in a coated magnet wire that is related to changes in film density due to external stresses, such as resulting from immersion in water. To the naked eye, such region reflects light so as to appear like a crack or series of tiny cracks, and under stress it can eventually produce a crack and form a dielectric breakdown in that section of the polymer. In addition to resulting in an unsightly product, where product appearance is very important, such water crazing as indicated can have an adverse effect on the electrical properties of the coated magnet wire.

There have been some polymer systems, e.g. as described in U.S. Pat. No. 3,925,313 which have made great strides in this area, for example solving many of the above cited problems connected with a water soluble polymer system. However, poor water craze resistance, marginal polymer flexibility on wire, and poor enamel shelf-life stability are still problems in this art not totally solved by the '313 patent. And, as known to those skilled in this art, attempts to meddle in the chemistry of the polymers involved in this area generally has an adverse effect on one or another property of the polymer, either in its water solubility or properties after application in its intended use area.

Accordingly, what is needed in the art is a stable water soluble polymer composition with both improved properties in its end use while maintaining its attractive water solubility.

DISCLOSURE OF INVENTION

The present invention is directed to water soluble polyimides comprising the reaction product of butane tetracarboxylic acid, a multifunctional amine of the formula:

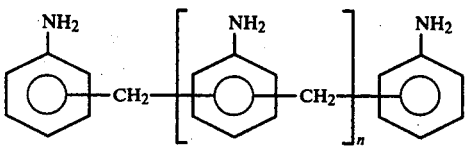

and a diamine, where n=0.3 and the multifunctional amine constitutes at least 5% of the total amine equivalents of the reactants.

Another aspect of the invention comprises a method of making the improved water soluble polymers according to the present invention by reacting butane tetracarboxylic acid or a derivative thereof with a multifunctional amine of the formula:

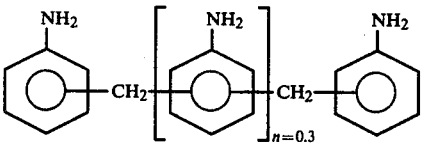

and subsequently reacting this mixture with at least one diamine.

Another aspect of the invention comprises an aqueous solution of the polyimide of the present invention containing up to about 40% by weight of the water soluble polyimide.

Another aspect of the invention comprises a process of producing an insulated electrical conductor by applying the polyimide to the conductor and curing the applied polyimide.

Another aspect of the invention comprises an electrical conductor insulated with a layer of the polyimide.

The foregoing, and other features and advantages of the present invention, will become more apparent from the following description.

BEST MODE FOR CARRYING OUT THE INVENTION

The butane tetracarboxylic acid is more properly referred to as 1, 2, 3, 4 butane tetracarboxylic acid. If desired, derivatives thereof such as the anhydrides, esters, amides, etc. can be used.

As the diamine component, aliphatic, alicyclic, and aromatic diamines can be used including mixtures thereof. Generically, these can be represented by the formula:

$$H_2N-R'-NH_2$$

where R' represents a divalent organic radical. Preferably there is always at least some aromatic diamine present with a mixture of hexamethylene diamine (HMDA) and methylene dianiline (MDA) being the most preferred diamine mixture used. While methylene dianiline is preferred as the aromatic diamine, any of a number of suitable diamine constituents will occur to those skilled in the art including 4,4'-diamino-2,2' sulfone diphenylmethane; meta-phenylene diamine; para-phenylene diamine; 4,4'-diamino-diphenyl propane; 4,4'-diaminodiphenyl methane benzidine; 2,6-diamino-pyridine; 2,4'-oxydianiline; 4,4'-diaminobenzophenone; bis(4-aminophenyl)-N-methylamine; 3,3'-dimethyl-4,4'-diaminobiphenyl;toluene diamine; m-xylylene diamine; p-xylylene diamine; and mixtures of the foregoing and the like.

The key component of the polyimides according to the present invention is the multifunctional amine of the following formula:

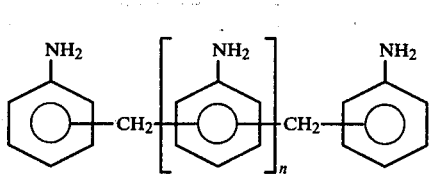

where n=0.3. This compound is available commercially under the trade name Curithane 103 from the Upjohn Company. By multifunctional amine is meant an amine with an amine functionality greater than 2 (per mole).

The ratios of reactants are also important for achieving the improved polymer and wire properties desired. While the multifunctional amine can be used in as little as about 5% of the total amine equivalents of the reactants and actually can constitute the entire amine content, it is preferably used in an amount of about 15% to about 40% of the total amine equivalents. The remainder of the amine reactants, as stated above, is preferably a mixture of aromatic and aliphatic diamine, with the aromatic diamine constituting at least about 52% of the diamine equivalents, and preferably about 58% to 83% of the total diamine equivalents. The butane tetracarboxylic acid component reacts difunctionally with the amine reactants to form the imide bond. Two carboxylic acid groups react with one amine group to form one imide bond. Two moles of water by-product are formed with each imide bond formation. Note also Table I below for sample reactant ratios.

TABLE I

| Reactant | Moles | Imide Forming Equivalents |
|---|---|---|
| BTC | 4 | 8 |
| Curithane | .17–1.39 | .4–3.2 |
| Other diamines | | |
| MDA | 2 | 4 |
| HMDA | 1.8–.4 | 3.6–.8 |

The BTC to amine molar reactant ratio is 100:98 for the sample which has 15% of the total amine equivalents the multifunctional amine. For the sample containing 40% multifunctional equivalents, this ratio is 100:94.8. The amine:BTC imide forming equivalents should always be at least 1:1 and preferably with a slight excess of amine 1.10 to 1.01:1. This ensures complete reaction of the BTC and a higher molecular weight polymer. Excess BTC results in limiting molecular weight build of the polymer and a loss of properties of the coated magnet wire.

The polyimides according to the present invention have upon completion of the synthesis a residual acid number (A.N.) of 95–100 as determined by titration.

$$A.N. = \frac{56.1 \times \text{Normality Base} \times \text{Volume Base}}{\text{Sample weight} \times \text{decimal percent solids}}$$

This results in a polymer of high molecular weight as determined by Gel Permeation Chromatography using Styragel columns and based upon a polystyrene calibration curve. The molecular weight distribution of the polymer is very narrow (monodispersed), while the polymer systems described in U.S. Pat. No. 3,925,313 are polydispersed and of much lower molecular weight. The final synthesized acid number of 95–100 is not meant to be limiting. However, if the synthesis is stopped at a higher acid number range (>120) a lower molecular weight polydispersed polymer results that looses mechanical properties when applied to wire and cured. If the synthesis is taken to a lower acid number range (<95), a very viscous material results that requires additional co-solvent in order to keep it mixable.

The reaction is carried out in a non-alcohol solvent such as n-methyl pyrrolidone (NMP) and water. While the solvents, reaction temperatures, etc. may vary, it is important for obtaining the improved polymer properties that the reaction is carried out in the following sequence. The butane tetracarboxylic acid (BTC) is dissolved in an NMP and water mixture and the Curithane 103 added. The mixture is heated to react the BTC and Curithane. The aromatic amine (MDA) is then added and the mixture heated until all visible signs of the MDA are gone (solution clears). The aliphatic amine can then be added to the reaction mixture (e.g. 70% by weight hexamethylene diamine in water) which is then heated until the reaction is complete. Both the solvent water and condensation water produced during the reaction are removed at this point during the reaction to help drive the reaction to completion. The reaction is generally run until about 80–85% of the theoretical water of condensation and all the solvent water charged is collected and the polymer residual acid number is 95–100. It is important for attaining the high molecular weights and polymer properties desired to take off this condensed water during the course of the reaction. Ammonia, or other amine solubilizing agents such as 2-amino-2-methyl-1-propanol, 2-dimethylamino-2-methyl-1-propanol and dimethylaminoethanol, are then added as solutions in water to solubilize the reaction product. The resulting enamel generally has a final acid number of 120–130. The final acid number of the enamel is 25–30 higher than the final polymer residual acid number because sufficient base is used to open additional imide groups of the polymer to the amic acid stage to give increased water solubility. The opening of these imide groups to amic acid does not reduce the polymer molecular weight and thus, does not affect the on-wire properties of the polymer.

While the polymer solution can be made at almost any concentration and viscosity desired depending upon end use and method of application, generally it is produced in up to 40% by weight solids concentration, and preferably 35% to 38%. Water and solubilizing amine are also added to preferably attain a pH of about 7 to 7.2 and a viscosity of 1800 to 2800 cps at 30° C.

EXAMPLE 1

13.98 grams of ethylene glycol, 6.93 grams of water, 20.43 grams of BTC, 17.81 grams of MDA and 5.65 grams of ammonia and 9.73 grams of water are heated at 85° C. until all of the material is reacted. 1.93 grams of ammonium carbonate and 7.69 grams of water are then added with heating and stirring to dissolve the polymer. The viscosity of the polymer solution is then adjusted to 1800-2800 cps at 30° C., a pH to 7-7.2 and about 40% solids by additionally adding 15.85 grams of water. An 18 AWG copper wire with an approximately 4 mil diameter is coated with a coating about 3.2 mil thick in about 6 passes. The wire after curing has, with a 25% elongation, a flex of approximately 3x. ASTM D1676-77. Its water craze resistance is excellent at 5% elongation, good at 10% elongation, and only marginal at 15 and 20% elongation.

EXAMPLE 2

A mixture of 12.37 grams of NMP, 3.03 grams of water, 20.61 grams of BTC, and 2.73 grams of Curithane 103 are heated at 85° C. until fully reacted as indicated by a clearing of the solution. 8.72 grams of MDA is then dissolved in the solution. This mixture is then heated to approximately 105° C. and a pack column utilized to keep all of the solvent and reaction water in solution. The heating is continued until all of the materials react as evidenced by clearing of the solution. 5.14 grams of a 70% solution of HMDA in water is then added to the reaction mixture and heated to 155° C. over a 6-8 hour period. The condensed water and the original solvent is allowed to come off during the course of this reaction, the bulk coming off at around 110° C. to 135° C. Heating continues until approximately 85% of the theoretical water of condensation and all the solvent water comes off. The material is cooled below 140° C. and solubilization with an ammonia-water solution begins. A pack column is also used at this point to keep the ammonia in the solution. Initially, 4.85 grams of a 28% by weight ammonia solution is added along with 14.47 grams of water. This composition is mixed and cooled until the temperature drops to 90° C. and is held there for one-half to one hour. The mixture is then cooled to 70° C. and an additional 1.15 grams of 28% ammonia and 26.93 grams of water is added to the solution to attain the desired 35-38% by weight solids content, 2000-3000 cps viscosity at 30° C., and a pH of 7-7.2. In this case, an additional 0.32 gram of a 28% ammonia solution and 3.18 grams of water are required to attain this range of properties for wire application.

An 18 AWG copper wire with an approximately 4 mil diameter is coated with approximately 3.0 mil coating (applied in 6 equal passes) at a speed of about 45 feet per minute (22.9 cm per second) with the above polymer. Using ASTM D1676-77 test procedures, the coated wire is determined to have the following properties: smoothness—excellent; dissipation factor at 230° C. of 5.2; flexibility at snap+mandrel of 3x; a slit twist adhesion of 73; dielectric in volts/mil of 3866; thermoplastic flow of 401° C.; heat shock at 20% elongation+3x at 250° C.; modified unilateral scrape of 28-0; burnout resistance of 560 seconds, and water craze resistance at 5%, 10%, and 15% elongation—all excellent.

EXAMPLE 3

The same process as recited in Example 2 is utilized to prepare a polyimide water solution utilizing as the initial reactants 12.13 grams of NMP, 3.03 grams of water, 18.63 grams of BTC and 6.56 grams of Curithane 103. 7.9 grams of MDA was then reacted with this composition followed by 1.34 grams of 70% HMDA. The ammonia and water is added in three separate additions as described above, the first addition comprising 4.36 grams of 28% ammonia and 13.09 grams of water, 0.8 gram of 28% ammonia and 28.66 grams of water, and the final addition for viscosity, pH, and solids content control 0.32 gram of 28% ammonia and 3.18 grams of water. A wire coated as described in Example 2 with about 2.8 mils of coating, had a flexibility of snap+1x, a thermoplastic flow of 446° C., heat shock at 20% elongation+3x of 250° C., and a burnout resistance of 690 seconds. Water craze resistance at 5%, 10%, 15% and 20% elongation are all excellent.

Not only can it be seen that the wire properties improve with increased amounts of multifunctional amine utilized as the reactive amine (compare Examples 2 and 3), but the water craze resistance of the polymers in Examples 2 and 3 is excellent at 5%, 10%, 15% and 20% elongations. Testing for crazing is performed by elongating the coated wires to 5%, 10%, 15% and 20% elongations. The elongated wires are then immersed in 3% by weight saline solution for 24 hours with a 12 volt DC charge across the length of the elongated wires. Crazing is measured by evidencing bubbles rising to the surface of the saline solution. The degree of crazing is directly measurable by the amount of bubbles being emitted. The greater the elongation, the greater the stress. In all cases, in Examples 2 and 3, there was no crazing on the wires tested. There is some crazing, evidenced by bubbles when elongation exceeded 5% with the polymer coated wire of Example 1, not made according to the present invention.

It is believed that one reason the polymers according to the present invention have properties superior to other water soluble polymers in this art is the higher degree of and controlled polymerization with the synthesis utilizing the specific reactants according to the present invention. For example, note Table II for controlled weight loss tests, further demonstrating the improved thermal properties of polymers according to the present invention. This is a thermogravimetric analysis which is performed by heating a sample of the polymer at a constant rate in air and measuring the weight loss. Heating was performed here at a rate of increase of 10° C./minute. The material of the first column has no multifunctional amine (Curithane) and in the subsequent columns, increasing amounts of multifunctional amine. As can be seen, the thermal stability of the material definitely increases with increasing multifunctional amine content.

One advantage of carrying out the reaction in the order described above is that the reaction cannot be made to differentiate the BTC from the particular amines. Carrying out the reaction in the order described provides for maximizing polymer chain length and therefore, molecular weights.

TABLE II

| % Wt. Loss | 0% Curithane | 5% Curithane | 10% Curithane | 15% Curithane (Run 1) | 15% Curithane (Run 2) | 40% Curithane |
|---|---|---|---|---|---|---|
| 5% | 343° C. | 351° C. | 368° C. | 354° C. | 344° C. | 365° C. |

TABLE II-continued

| % Wt. Loss | 0% Curithane | 5% Curithane | 10% Curithane | 15% Curithane (Run 1) | 15% Curithane (Run 2) | 40% Curithane |
|---|---|---|---|---|---|---|
| 10% | 396° C. | 403° C. | 400° C. | 403° C. | 402° C. | 414° C. |
| 15% | 423° C. | 426° C. | 431° C. | 426° C. | 426° C. | 433° C. |
| 20% | 440° C. | 440° C. | 446° C. | 439° C. | 440° C. | 445° C. |
| 25% | 453° C. | 454° C. | 461° C. | 453° C. | 454° C. | 460° C. |
| 30% | 464° C. | 472° C. | 477° C. | 469° C. | 470° C. | 479° C. |
| 40% | 493° C. | 503° C. | 510° C. | 498° C. | 506° C. | 503° C. |
| 50% | 518° C. | 521° C. | 533° C. | 517° C. | 529° C. | 518° C. |
| 60% | 532° C. | 533° C. | 547° C. | 537° C. | 543° C. | 531° C. |
| 70% | 541° C. | 543° C. | 554° C. | 548° C. | 551° C. | 545° C. |
| 80% | 548° C. | 552° C. | 561° C. | 556° C. | 558° C. | 555° C. |
| 90% | 554° C. | 564° C. | 569° C. | 563° C. | 565° C. | 569° C. |

For example, utilizing the process of Example 1, which is indicative of the prior art, produces polydispersed polymers with a molecular weight distribution that contains a significant quantity of lower molecular weight material. However, utilizing the processes of Examples 2 and 3, produces polymers with a narrow molecular weight distribution (monodispersed) and of a significantly higher average molecular weight. Another big advantage of the polymers according to the present invention is that very little polymerization takes place on the wire after coating. This clearly distinguishes the polymer and the coating process of the present invention from those of the prior art. For example, because of the lower molecular weights attained in the '313 patent, much more polymerization takes place on the wire. When too much polymerization is allowed to take place on the wire, crosslinking becomes a completing reaction, resulting in shorter polymer chain lengths and inferior wire properties.

A good demonstration of desirable wire properties is the flex test where, for Example 1, utilizing no multifunctional amine and a batch type synthesis flex was measured at 25% elongation+3x, whereas in Example 2, utilizing 15% multifunctional amine and sequential amine reaction flex was snap+2x; and for the 40% multifunctional amine polymer of Example 3, snap+1x was attained. In this test, elongation refers to amount of stretch, a snap being rapid stretch, and the x value refers to the multiplicity of wire diameter size the coated wires being tested are wrapped on. The significance of the results of this testing is that the thermal improvement in properties can be somewhat expected from the higher molecular weights attainable by the synthesis according to the present invention, but the improved flexibility is totally unexpected. There is clearly a superiority in flex properties utilizing the multifunctional amine in the synthesis according to the present invention.

Another important advantage of the aqueous solutions according to the present invention are their improved shelf life. The polymer made according to Example 1 containing no multifunctional amine increased in viscosity by several thousand cps over a six month period. Whereas, the increase in viscosity of the polymers according to the present invention in aqueous solution over a six month period was insignificant. Because the molecular weights of polymers according to the present invention are somewhat higher, there is more difficulty in getting the polymers into water solution. However, by utilizing a slight excess of base during solubilization, more imide rings are opened making water solubility readily attainable.

A critical step in the synthesis according to the present invention is the reaction of the multifunctional amine and the BTC before addition of other amines. This directly contributes to the improved wire properties by capturing the aromatic moieties in long chain pre-polymer form. If any aliphatic amine is added, it is reacted after the multifunctional amine and aromatic diamine have been significantly reacted.

While the polymers according to the present invention can be used on any electrical conductor, they are preferably used on wires and specifically magnet wires. The wires are generally copper or aluminum. And wires ranging anywhere from 1.5 to 5 mils in diameter are coated, with 4 mils being the most commonly coated wire. Wire coatings can be anywhere from 2-5 mils or any thickness desired, and preferably about 3.2 mils applied in 6 coatings of equal thickness with curing between coats. The coatings can be used as a sole insulation coat or part of a multicoat system in combination with other conventional polymer insulations. The coatings can be applied by any conventional means such as coatings dies, roller or felt application with viscosity adjustments made accordingly. For example, viscosities (at 30° C.) of about 2000 cps are preferred for coating die application, 100-200 cps for roller application, and 40-100 cps for felt application. Conventional drying ovens are used to cure the coatings and speeds of 40-55 feet per minute (20.3-27.9 cm per sec) and preferably about 45 feet per minute (22.9 cm per sec) are used for both coating and curing. Inlet oven temperatures of the order of about 500°-700° F. (260°-371° C.), preferably about 580° F. (304° C.) and outlet oven temperature of about 800°-1100° F. (427°-593° C.) and preferably about 900° F. (482° C.) are used for drying and curing.

While this invention has been described in terms of magnet wire insulation, this invention includes the use of this material as a free standing film, e.g. for such uses as phase insulation, coil wrapping etc., and as varnishes for uses other than magnet wire insulation.

Although this invention has been shown and described with respect to detailed embodiments thereof, it will be understood by those skilled in the art that various changes in form and detail thereof may be made without departing from the spirit and scope of the claimed invention.

We claim:

1. A water soluble polyimide comprising the reaction product of 1, 2, 3, 4 butane tetracarboxylic acid, a multifunctional amine of the formula:

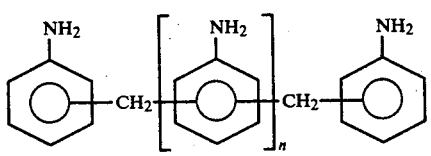

and at least one diamine; where n=0.3, the multifunctional amine constitutes at least 5% of the total amine equivalents of the reactants and the butane tetracarboxylic acid to amine molar ratio is 100:94.8 to 100:98.

2. The water soluble polyimide of claim 1 wherein the diamine comprises a mixture of methylene dianiline and hexamethylene diamine.

3. The water soluble polyimide of claim 1 wherein the multifunctional amine constitutes at least 40% of the total amine equivalents of the reactants.

4. A method of making a water soluble polyimide comprising (a) at least partially reacting 1, 2, 3, 4 butane tetracarboxylic acid with a multifunctional amine of the formula:

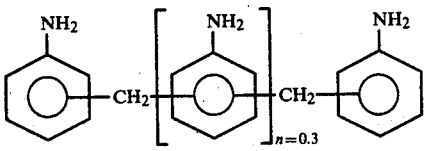

(b) adding an aromatic diamine to the reaction mixture and heating to effect further reaction, (c) adding an aliphatic diamine to the reaction mixture, the butane tetracarboxylic acid to amine molar ratio being about 100:94.8 to 100:98, and (d) driving off all reaction condensed water and heating to effect further reaction, thereby forming a water soluble polyimide with a non-dispersed molecular weight distribution.

5. The method of claim 4 further comprising (d) adding an aqueous solution of ammonia to the reaction mixture to make an aqueous solution of the polyimide.

6. The method of claim 4 or 5 where the aromatic diamine is methylene dianiline and the aliphatic diamine is hexamethylene-diamine.

7. The process of claim 4 or 5 where in step (a) the reaction takes place at 50° C. to 100° C. for up to one hour, in step (b) the reaction takes place at 50° C. to 105° C. for up to one hour and in step (c) the reaction takes place at 100° C. to 200° C. for up to 12 hours.

* * * * *

UNITED STATES PATENT AND TRADEMARK OFFICE
CERTIFICATE OF CORRECTION

PATENT NO. : 4,389,510

DATED : June 21, 1983

INVENTOR(S) : Charles W. McGregor; Lionel J. Payette

It is certified that error appears in the above-identified patent and that said Letters Patent is hereby corrected as shown below:

Column 10, line 15 "non-" should read -- mono- --.

Signed and Sealed this

Twenty-third Day of April 1985

[SEAL]

Attest:

DONALD J. QUIGG

Attesting Officer

Acting Commissioner of Patents and Trademarks